United States Patent [19]
Johnson

[11] Patent Number: 5,881,216
[45] Date of Patent: *Mar. 9, 1999

[54] REGISTER FILE BACKUP QUEUE

[75] Inventor: Anders R. Johnson, Fremont, Calif.

[73] Assignee: Seiko Epson Corporation, Tokyo-to, Japan

[*] Notice: The term of this patent shall not extend beyond the expiration date of Pat. No. 5,588,113.

[21] Appl. No.: 771,911

[22] Filed: Dec. 23, 1996

Related U.S. Application Data

[63] Continuation of Ser. No. 403,527, Mar. 13, 1995, Pat. No. 5,588,113, which is a continuation of Ser. No. 846,237, Mar. 5, 1992, Pat. No. 5,398,330.

[51] Int. Cl.$^6$ .................................................. G06F 11/00
[52] U.S. Cl. ................................ 395/182.13; 395/185.02
[58] Field of Search ........................ 395/182.13, 182.14, 395/182.15, 182.19, 185.02, 569, 571, 182.09, 591, 586, 392

[56] References Cited

U.S. PATENT DOCUMENTS

| | | | |
|---|---|---|---|
| 3,654,448 | 4/1972 | Hitt ...................................... | 395/182.15 |
| 3,736,566 | 5/1973 | Anderson et al. .................... | 340/172.5 |
| 4,044,337 | 8/1977 | Hicks et al. ......................... | 395/182.14 |
| 4,287,560 | 9/1981 | Forbes et al. ............................ | 364/200 |
| 4,385,365 | 5/1983 | Hashimoto et al. ..................... | 364/900 |
| 4,777,594 | 10/1988 | Jones et al. ............................. | 364/200 |
| 4,912,707 | 3/1990 | Kogge et al. ............................. | 305/575 |
| 5,023,828 | 6/1991 | Grundmann et al. .................... | 364/900 |
| 5,119,483 | 6/1992 | Madden et al. ..................... | 395/182.13 |
| 5,146,569 | 9/1992 | Yamaguchi et al. ..................... | 395/375 |
| 5,148,536 | 9/1992 | Witek et al. ............................. | 395/425 |
| 5,197,132 | 3/1993 | Steely, Jr. et al. ....................... | 395/375 |

(List continued on next page.)

FOREIGN PATENT DOCUMENTS 0106670  4/1984  European Pat. Off. .......... G06F 9/38

OTHER PUBLICATIONS

"Use of a Second Set of General Purpose Registers to Allow Changing Genreal Purpose Registers During Conditional Branch Resolution,", *IBM Technical Disclosure Bulletin.*, vol. 29, No. 3, Aug. 1986, pp. 991–993.

Hwu et al., "Checkpoint Repair for High Performance Out–of–Order Execution Machines," *IEEE Trans. on Computers*, vol. C–36, No. 12, Dec. 1987, pp. 1496–1514.

(List continued on next page.)

*Primary Examiner*—Joseph E. Palys
*Attorney, Agent, or Firm*—Sterne, Kessler Goldstein & Fox P.L.L.C.

[57] ABSTRACT

A register file backup system for with a computer which processes instructions to generate results which thereby change the visual state of the computer. The computer has a register file with a plurality of addressable locations for storing data. The backup system is adapted to return the visual state of the computer to a previous state if an instruction generates an exception. The backup system utilizes less overhead so as to provide easier register file backup than a comparable software or hardware device. The backup system comprises first means for sequentially storing in program order, address information corresponding to destination locations in the register file where instruction results are to be stored. The first means has first and second outputs for transferring the address information stored therein: the first output being coupled to the register file for transferring a first portion of the address information to the register file, and the second output is used for transferring a second portion of address information for backup storage of the register file contents. The backup system also has a second means coupled to (1) the second output of the first means, for receiving and storing the second portion of the address information, and (2) the register file, for receiving and backup storing further information corresponding to the contents of one or more destination locations in the register file before that destination location is changed according to second portion of the address information.

22 Claims, 2 Drawing Sheets

U.S. PATENT DOCUMENTS

| | | |
|---|---|---|
| 5,291,589 | 3/1994 | Matsuura et al. .................. 395/182.13 |
| 5,325,520 | 6/1994 | Nguyen et al. .......................... 395/575 |
| 5,398,330 | 3/1995 | Johnson .................................. 395/575 |
| 5,423,011 | 6/1995 | Blaner et al. ........................... 395/375 |
| 5,430,888 | 7/1995 | Witek et al. ............................ 395/800 |
| 5,588,113 | 12/1996 | Johnson ............................. 395/182.13 |
| 5,590,294 | 12/1996 | Mirapuri et al. ........................ 395/591 |
| 5,651,125 | 7/1997 | Witt et al. ............................... 395/394 |

OTHER PUBLICATIONS

"Roll–Back Interrupt Method for Out–of–Order Execution of System Programs," *IBM Technical Disclosure Bulletin,* vol. 32, No. 5A, Oct. 1989, pp. 33–36.

Smith et al., "Implementation of Precise Interrupts in Pipelined Processors," *Proceedings of the 12th International Symposium on Computer Architecture,* Jun. 1985, pp. 36–44.

REGISTER FILE BACKUP QUEUE

This application is a continuation of application Ser. No. 08/403,527, filed Mar. 13, 1995, now U.S. Pat. No. 5,588, 113 which is a continuation of application Ser. No. 08/846, 237, filed Mar. 5, 1992, now U.S. Pat. No. 5,398,330.

BACKGROUND OF THE INVENTION

1. Field of the Invention

The present invention relates to the management of the program-visible machine state of computers, and more particularly, to a computer register file system and method adapted to handle exceptions which prematurely overwrite register file contents.

2. Related Art

A more detailed description of some of the basic concepts discussed in this application is found in a number of references, including Mike Johnson, *Superscalar Microprocessor Design* (Prentice-Hall, Inc., Englewood Cliffs, N.J., 1991); John L. Hennessy etal, *Computer Architecture—A Quantitative Approach* (Morgan Kaufmann Publishers, Inc., San Mateo, Calif. 1990). Johnson's text, particularly Chapter 5, provides an excellent discussion of register file exception handling.

Supporting exception handling and in particular precise interrupts, presents a complicated set of problems for the computer architect. For example, the result of a particular instruction cannot be written to a central processor unit's (CPU) register file, or any other part of the program-visible machine state, until after it can be determined that the instruction will not signal any exceptions. Otherwise, the instruction will have an effect on the visible state of the machine after the exception is signaled. (The terms CPU, computer and processor will be used interchangeably throughout this document).

Historically, this problem has been circumvented by increasing the number of processor pipeline stages (pipeline depth) so that the write does not occur until after the latest exception is determined. However, this reduces the allowable degree of instruction interlocking and/or increases the amount of by-pass circuitry required, either of which typically degrades overall performance.

The concept of a "history buffer" is described by J. E. Smith et al. ("Implementation of Precise Interrupts in Pipelined Processors", *Proceedings of the 12th Annual International Symposium on Computer Architecture* (June 1985), pp. 36–44), as a means for implementing precise interrupts in a pipeline scalar processor with out-of-order completion. In this approach, the register file contains the program-visible state of the machine, and the history buffer stores items of the in-order state which have been superseded by items of lookahead state (i.e., it contains old values that have been replaced by new values; hence the name history buffer).

The history buffer is managed as a circular buffer. Each entry in the history buffer is assigned an entry number. There are n entries in the history buffer, where n corresponds to the length of the longest functional unit pipeline. A head and a tail tag are used to identify the head of the buffer, and the entry in the buffer reserved for the instruction, respectively. Entries between the head and tail are considered valid.

At issue time, each history buffer entry is loaded with: (1) the value of the register file prior to the issuing of the instruction, and control information including: (2) a destination register of the result, (3) the program counter, and (4) either an exception bit or a validity bit, depending on whether an exception is generated at the time of issue.

A Result Shift Register is used in conjunction with the history buffer to manage various machine control signals, including a reorder tag which is required to properly restore the state of the machine do to out-of-order completion. The result shift register includes entries for the functional unit that will be supplying the result and the destination register of the result. The result shift register is operated as a first-in first-out (FIFO) stack.

Results on a result bus from the processor's functional unit(s) are written directly into the register file when an instruction completes. Exception reports come back as an instruction completes and are written into the history buffer. The exception reports are guided to the proper history buffer entry through the use of tags found in the result shift register. When the history buffer contains an element at the head that is known to have finished without exceptions, the history buffer entry is no longer needed and that buffer location can be re-used (the head pointer is incremented). The history buffer can be shorter than the maximum number of pipeline stages. If all history buffer entries are used (the buffer is too small), issue must be blocked until an entry becomes available. Hence, history buffers are made long enough so that this seldom happens.

When an exception condition arrives at the head of the history buffer, the buffer is held, instruction issue is immediately halted, and there is a wait until pipeline activity completes. The active buffer entries are then emptied from tail to head, and the history values are loaded back into their original registers. The program counter value found in the head of the history is the precise program counter.

The extra hardware required by this method is in the form of a large buffer to contain the history information. Also the register file must have three read ports since the destination value as well as the source operands must be read at issue time.

In view of the forgoing, it is clear that a simplified backup system is therefore required to handle exceptions.

SUMMARY OF THE INVENTION

The present invention is directed to a register file backup queue system and method for use with a computer which processes instructions to generate results which thereby change the visual state of the computer. The computer has a register file with a plurality of addressable locations for storing data. The backup system of the present invention is adapted to return the visual state of the computer to a previous state if an instruction generates an exception. The backup system utilizes less overhead so as to provide easier register file backup than a comparable software or hardware device.

The present invention sequentially stores in program order in a result tag queue, address information corresponding to destination locations in the register file where instruction results are to be stored.

From the result tag queue, a first portion of the address information is transferred to the register file and a second portion of address information is transferred to a backup queue for backup storage of the register file contents.

The backup queue also receives and stores further information corresponding to the contents of one or more destination locations in the register file before that destination location is changed according to said second portion of said address information.

The present invention transfers said further information from said backup queue back to the register file locations according to said second portion of said address information stored in said backup queue if an instruction exception is generated.

Before an instruction is retired, the value of any program-visible state that an instruction may modify (including, but not limited to, the prior value of the register file destination register) is read such that all instructions up to and including the previous instruction have taken effect prior to the read. The resulting data are placed in the backup queue that, in effect, "remembers" the program-visible state of the processor exactly prior to any given "uncommitted instruction", and thus can be used to nullify the effect of any instruction that causes an exception. (An "uncommitted instruction" is defined by Hennessy et al. as an instruction that may cause an exception at some future time.)

The present invention thus provides a mechanism by which interrupts can be supported for exceptions that are signaled after the result is written and without out-of-order completion. Design complexity is minimally increased, in that the pipeline depth of the processor does not need to be increased to handle the late-exception case. This approach is easier to "tack on" to an existing design (e.g., in the case that an enhancement makes the late-exception case possible where it was not possible before) rather than increasing the pipeline depth. In some configurations, overall performance is not significantly impacted, except in the case that an exception occurs.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings in which.

DETAILED DESCRIPTION

The operation of the invention is illustrated with reference to a representative block diagram shown in FIG. 1

Figure 1:
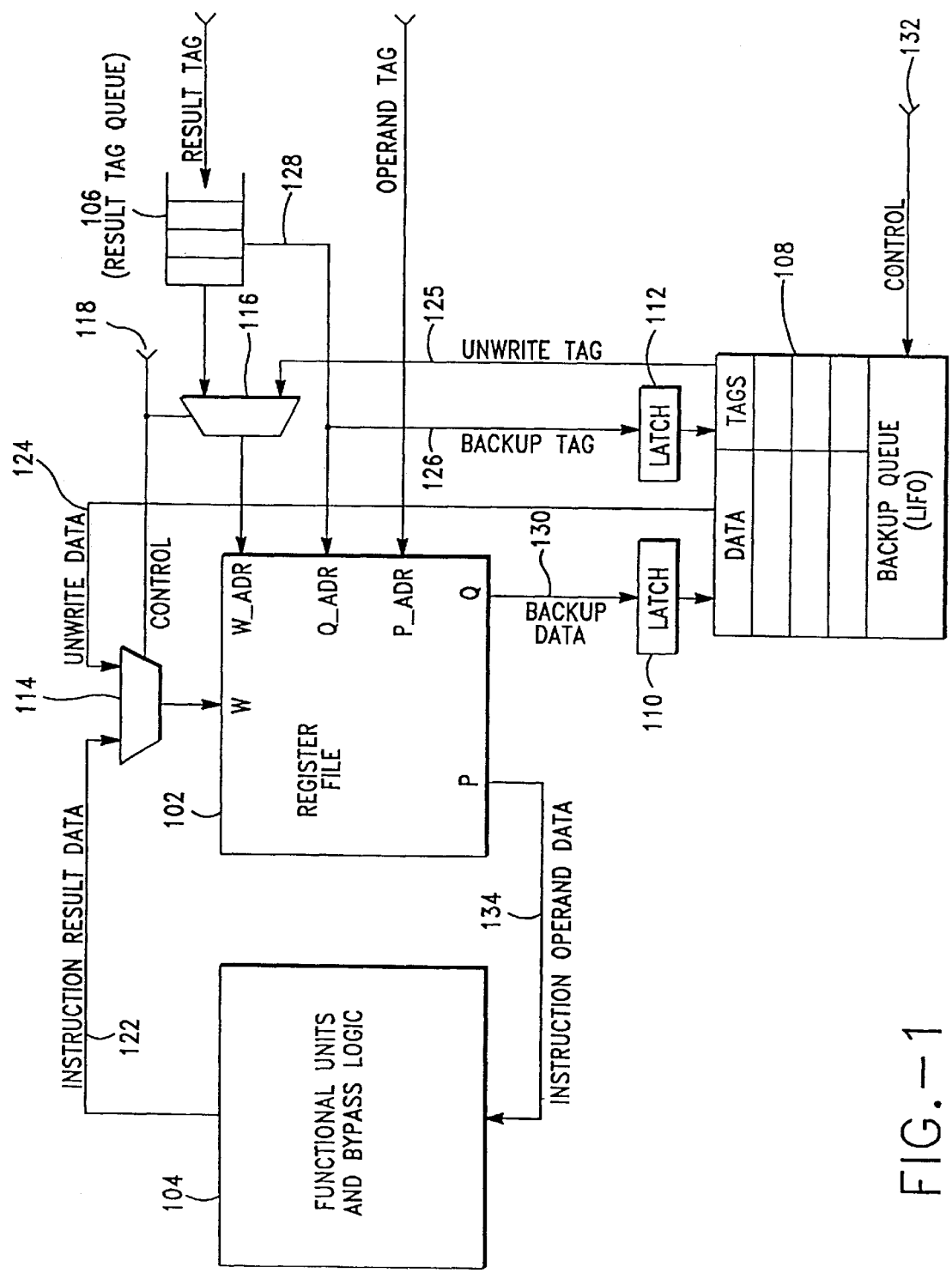
FIG. 1 shows a representative block diagram of a register file backup queue system of the present invention.

In this example, the computer register file system environment of the present invention as shown in FIG. 1 comprises a register file 102 having a plurality of addressable locations for storing instruction operands and results, functional units and bypass logic 104, a result tag queue 106 for storing information corresponding to the address of the register file location that is designated by the instruction to store results (also called result tag), a backup queue 108, a backup data latch 110, a backup tag latch 112, a data multiplexer 114 and an address/tag multiplexer 116.

In the above example it is easiest to think of the block 102 as a register file of a central processor unit (also called the processor, CPU or computer), but the present invention applies to any part of (or the entirety of) the program-visible machine state without loss of generality.

Register file 102 includes a P_adr input to receive information corresponding to the address(es) of the register (s) storing the operand(s) of the instruction (also called operand tags). The operands are stored in register file 102 and are passed to functional units 104 via a bus 134 for execution of the instruction in a conventional manner.

In addition to reading the operands of the instruction, the system determines the destination register to receive the results of the instruction. The system then reads the contents of that destination register prior to execution of the instruction and stores the contents and a tag (e.g., the address of the register file entry, for example) corresponding to the destination register into backup queue 108. In the event of an exception (e.g., an arithmetic exception such as an add overflow), the state of register file 102 prior to the exception can be restored by reading the contents of backup queue 108 and storing that data back into register file 102 at the location specified by the corresponding tag.

To coordinate backup of data in register file 102 a result tag queue 106 is required. Result tag queue 106 stores tags corresponding to the destination location in register file 102 for storing instruction results. Result tags are generated by decoding the instructions in a conventional manner. The tags stored in result tag queue 106 are stored in a first-in-first-out manner in execution order. Result tag queue 106 delays the tag until the previous instructions have completed in case they write to the same destination location in the register file.

The depth of backup queue 108 depends on the number of pipeline stages (i.e., cycles) between the cycle the register file is written and the cycle that an exception is detected.

One embodiment of the present invention comprises a three stage pipeline with fetch, decode and execute/store operations. In this embodiment, an exception can only be signaled during the same cycle that register file 102 is written. Therefore, backup queue 108 only needs to be deep enough to store the contents of one destination register and its tag.

Conventionally, if several instruction results are written to register file 102 and an exception occurs after a multi-cycle pipeline delay, the result is that many states of the machine would be wiped out by the late signaled exception. In the present invention, however, by deepening the backup queue 108 the lost states can be recovered in order to be able to restore those lost states. Before the exception can be handled, all previous results (those in the register file before the instruction executed) must be written back into register file 102 up to the instruction preceding the instruction that generated the exception.

As appreciated by those skilled in the art, signals that indicate whether a data exception (for example) has occurred originate in the data path and are detected by control logic (not shown). Control logic then determines what to do and generates a control signal 118 (shown in FIG. 1) which selects one of the sets of inputs of MUXs 114 and 116.

Under normal operation (i.e., no exception), control signal 118 controls MUX 114 to select "instruction result data" 122 from functional units 104 to pass the results to register file 102's write port W.

If an exception is detected, control signal 118 controls MUX 114 to select "unwrite data" 124 from backup queue 108 to return the state of the register file to the state that it was in just prior to the instruction that caused the exception. The unwrite data 124 is that data on the top of the backup queue 108.

Similarly, under normal operation (i.e., no exception), control signal 118 controls MUX 116 to select a result tag from the top of result tag queue 106 to a write address input W_adr of register file 102. If an exception is detected, control signal 118 controls MUX 116 to select an "unwrite tag" 125 from backup queue 108 to instruct register file 102 where to store the unwrite data.

The backup of data will now be discussed. As shown in FIG. 1, register file 102 also includes an input port "Q_adr" for receiving information concerning instruction operands from result tag queue 106. The Q_adr input port receives a "backup tag" 126 from result tag queue 106 corresponding to the data that is to be written into the backup queue 108. In this example, a bus 128 is shown connected to the entry of result tag queue 106 that is to be written to the register file 102 in the next cycle. At the same time a result tag is sent to the Q_adr input it is sent via bus 128 to backup queue 108 and is temporarily stored in a tag latch 112. This permits the present invention to store the results to be overwritten by the next instruction in backup queue 108. Register file 102 outputs the "backup data" 130 corresponding to the backup tag 126 via a data output port "Q". Backup data 130 is sent to a data latch 110 so that its corresponding backup tag 126, which arrived earlier at tag latch 112, can be latched into backup queue 108 at the same time.

A control line 132 is provided to switch the direction of stacking of backup queue 108. In normal operation, backup data and backup tags are pushed into backup queue 108. In this example the backup queue 108 has a depth of one. Depending on its depth, old information is said to be "pushed out of the bottom" of the stack when the last entry is written over by newer information. If an exception is detected, control signal 132 reverses the direction of backup queue 108 and information is popped off in a last-in, first-out fashion, and is stored back into register file 102.

The process of unwriting can be controlled either by hardware or by the operating system in software. However, if the operating system does it, then care must be taken to ensure that the instructions that control the process do not write into backup queue 108 themselves; that is, there must be a mechanism for disabling the queue before the exception handler is invoked.

In a preferred embodiment of the present invention, an additional read port (i.e., in addition to the P port) is not required because the read stage and write state are separated by exactly one cycle, and one of the following conditions is satisfied:

1. There are instructions that cannot generate late exceptions that require a read port in addition to those required by instructions that can generate late exceptions, and the depth of backup queue 108 is exactly 1 (ie., the latest exception signals exactly one cycle too late to abort the corresponding write).
2. Every instruction that requires the maximum number of read ports always writes to the same register number as one of its arguments.

If one of the previous conditions is satisfied, but the read stage and the write stage are separated by more than one cycle, then the present invention is still applicable without increasing the number of register-file read ports. In this case, it is necessary to read into backup queue 108 at the read stage instead of the stage before write, and to deepen backup queue 108. This, however, is not optimum because the additional interlock (from the result of a previous instruction to the backup read) may degrade performance.

Figure 2:
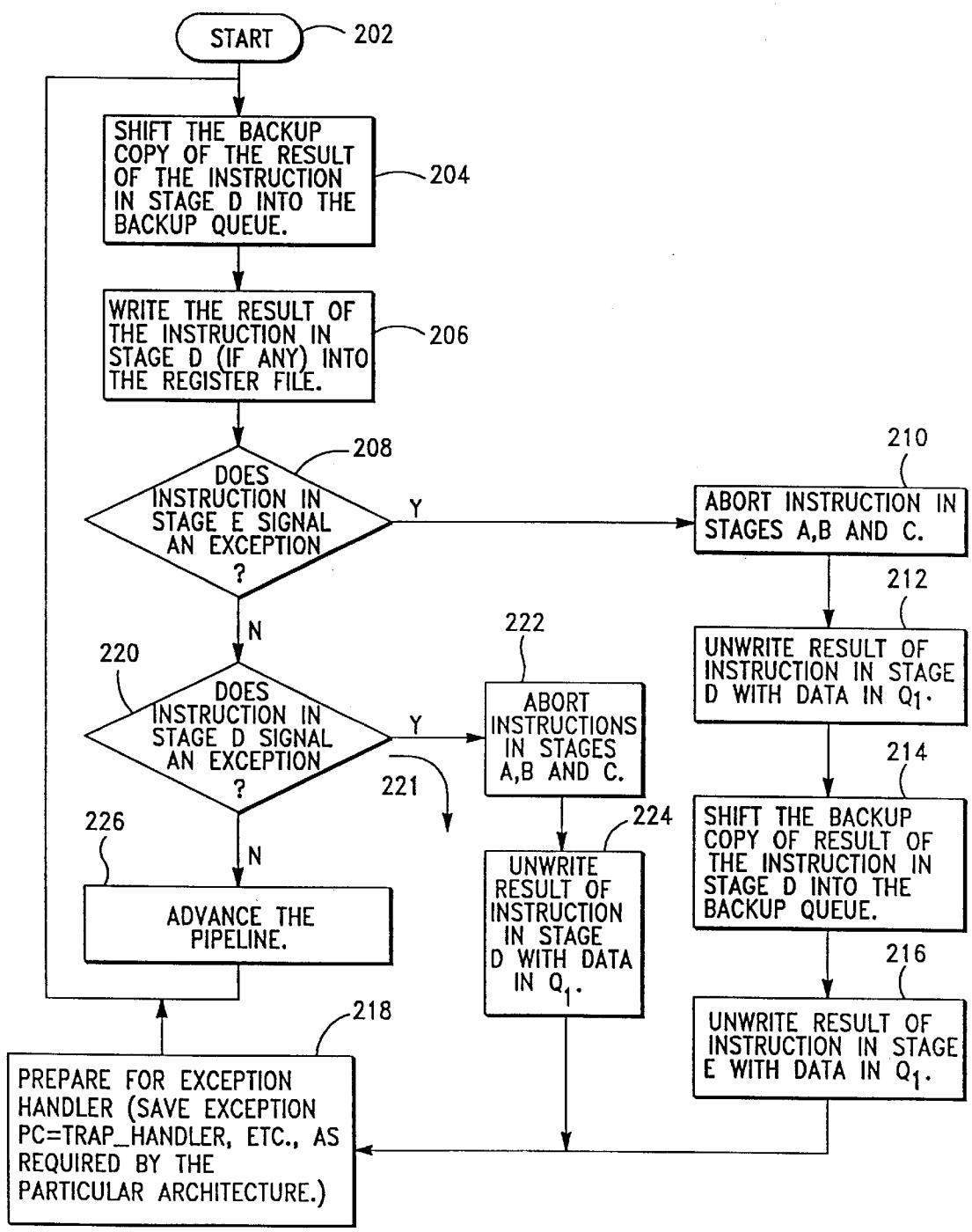
FIG. 2 is a representative flow chart showing the basic steps taken by the register file backup queue system of the present invention.

As an example of the present invention, consider a machine with 5 pipeline stages A, B, C, D, and E, as shown below in Table 1. A representative flow chart of this example is shown in FIG. 2. Table 1 and FIG. 2 will be referred to jointly in the following discussion. The write occurs in stage D. An exception can occur in state E. Exceptions that signal after stage C of an instruction cannot prevent that instruction from writing. (Reads can occur in any of stages A, B or C without relevance to this example.) Backup queue 108 of the present invention must be two storage locations deep because exceptions can signal two cycles too late to prevent the corresponding write.

In Table 1, the cycle numbers 1–9 are shown along the top, and instructions i through i+4 and backup queue storage locations $Q_1$ and $Q_2$ are shown along the left hand side.

TABLE 1

Examples Pipeline with Backup Queue

| | Cycle Number | | | | | | | | |
|---|---|---|---|---|---|---|---|---|---|
| | 1 | 2 | 3 | 4 | 5 | 6 | 7 | 8 | 9 |
| i* | A | B | C | D | E | | | | |
| i + 1* | | A | B | C | D | E | | | |
| i + 2* | | | A | B | C | D | (E)*** | | |
| i + 3* | | | | A | B | C | D | | |
| i + 4* | | | | | A | B | C | | |
| $Q_1$** | i − 3 | i − 2 | i − 1 | i | | i + 1 | i + 2 | i + 3 | i + 3 | i + 2 |
| $Q_2$** | i − 4 | i − 3 | i − 2 | i − 1 | i | | i + 1 | i + 2 | i + 2 |

*Instruction Number
**Backup Queue
***Exception Signaled

The backup and exception detection of instruction i+2 is shown in FIG. 2. The operation starts at a step 202. Instruction i+2 is backed up into backup queue $Q_1$ at stage D in cycle 6, as shown in a step 204. The result of instruction D is sent to the register file, as shown at a step 206. Suppose an exception is caused by instruction i+2 and signals in cycle 7 (see the yes branch "Y" at a conditional step 208). At this point, the instructions in stages A, B (not shown in cycle 7) and C are aborted (see a step 210), but the results of all instructions through instruction i+3 have already been written, However, from the program's viewpoint, instructions i+2 and i+3 should not have affected the state because of the exception. The state overwritten by these two instructions is stored in the backup queue (see a step 212). The data in $Q_1$ is written back into the register file at the destination address of instruction i+3 in cycle 8 (see a step 214). Then the backup queue shifts in the reverse direction and the data in $Q_1$ is written back at the destination of instruction i+2 in cycle 9 (see a step 216). The entire visible state now has an appropriate value for the first instruction of the exception handler to be fetched and executed (see a step 218).

Note that if instruction i–2 did not signal an exception in stage E and instruction i–3 signaled an exception in stage D, then the process would be much the same, except that instruction i–2 would not be nullified. (See loop 221 comprising steps 222 and 224.) If no exception is detected, the pipeline is merely advanced, as shown in a step 226, and execution continues.

In a further embodiment of the present invention, it is possible to use this invention to manage part of the visible state while deepening the pipeline for the remainder of the state. The most likely application is to use a backup queue for the register file(s) while delaying the retire for status bits, since it may be possible to implement bypass logic for the status bits without degrading performance.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A method for backing up register file data for use in a computer system having a multi-state pipeline that processes computer instructions, which upon execution generate a result, wherein for each result produced the method comprises:

storing the result in one of a plurality of storage locations of a register file;

producing a result tag, wherein each result tag corresponds to a destination address specified by a corresponding computer instruction;

storing each result tag in one of a plurality of storage locations of a result tag queue; and storing, in a backup queue, a portion of a next instruction result tag as a backup tag and data from said register file as backup data, wherein said data from said register file corresponds to data stored at a destination address specified by said next instruction result tag.

2. The method of claim 1, further comprising providing said backup queue with a depth dependent on a number of pipeline stages of the multi-stage pipeline between a cycle the register file is written and a cycle that an exception is detected.

3. The method of claim 2, further comprising:

detecting the exception; and generating a control signal to control
      a first multiplexer to select between said result data and unwrite data, wherein said unwrite data is backup data previously stored in said backup queue; and
      a second multiplexer to select between said result tag and an unwrite tag, wherein said unwrite tag is a particular backup tag previously stored in said backup queue.

4. The method of claim 3, further comprising:

applying said control signal to said first multiplexer to select prior unwrite data and to said second multiplexer to select a given unwrite tag associated with said prior unwrite data to thereby restore said computer system to a computer visual state prior to the exception, wherein said given unwrite tag corresponds to a location in said register file in which to place said prior unwrite data.

5. The method of claim 4, further comprising:

temporarily storing said backup data in a first latch prior to being stored in said backup queue; and temporarily storing said backup tag in a second latch prior to being stored in backup queue.

6. The method of claim 1, further comprising:

temporarily storing said backup data in a first latch prior to being stored in said backup queue; and temporarily storing said backup tag in a second latch prior to being stored in backup queue.

7. The method of claim 6, further comprising:

inputting said backup data temporarily stored in said first latch and said backup tag temporarily stored in said second latch into said backup queue substantially simultaneously.

8. The method of claim 5, further comprising:

inputting said backup data temporarily stored in said first latch and said backup tag temporarily stored in said second latch into said backup queue substantially simultaneously.

9. A register file backup system for use with a computer that processes instructions to generate results that change the visual state of the computer, the computer having a register file with a plurality of addressable locations for storing data, the backup system adapted to return the visual state of the computer to a previous state if an instruction generates an exception, the backup system comprising:

a last-in, first-out (LIFO) backup queue having a plurality of storage locations to store backup data and a next destination location therein;

a first-in, first-out (FIFO) result tag queue that sequentially stores in program order, address information corresponding to destination locations in the register file where instruction results are to be stored, wherein said FIFO result tag queue has first and second outputs that transfer said address information stored therein, said first output transfers a first destination location to the register file, and said second output transfers a next destination location to both the register file and said LIFO backup queue, and wherein said LIFO backup queue
      (a) receives and stores said next destination location from said second output of said FIFO result tag queue,
      (b) receives and stores said backup data which corresponds to contents of said next destination location in the register file before said contents of said next destination location are changed, and
      (c) transfers said backup data back to said next destination location in the register file after an instruction generates an exception.

10. The system according to claim 9, wherein said LIFO backup queue has a depth dependent upon the number of pipeline stages between a cycle the register file is written and cycle that an exception is detected.

11. The system according to claim 9, wherein said FIFO result tag queue further comprises a plurality of storage locations that store said address information corresponding to destination locations in the register file where instruction results are to be stored, wherein said address information comprises a tag that is part of the address of the destination location in the register file.

12. The system according to claim 11, wherein said first output of said FIFO result tag queue obtains said first destination location address information from a separate storage location in said FIFO result tag queue than said second output obtains said next destination location address information.

13. The system according to claim 11, wherein said first destination location address information and said next destination location address information are stored in separate storage locations in said FIFO result tag queue.

14. The system according to claim 9, further comprising:

a first latch that temporarily stores said next destination location prior to being stored in said LIFO backup queue; and a second latch that temporarily stores said backup data prior to being stored in said LIFO backup queue.

15. The system according to claim 9, further comprises:

a first multiplexer having a first input that receives said first destination location from said first output of said FIFO result tag queue and a second input that reads out said next destination location from said LIFO backup queue; and a second multiplexer having a first input that receives instruction results and a second input that reads out said backup data from said LIFO backup queue.

16. A computer system that processes instructions to generate results that change the visual state of the computer system, comprising:

a register file having a plurality of addressable locations adapted to store result data; and a register file backup system adapted to return a visual state of the computer system to a previous state when an instruction generates an exception, said register file backup system having:

a first-in, first-out (FIFO) result tag queue that sequentially stores in program order, address information corresponding to destination locations in said register file where instruction results are to be stored, said FIFO result tag queue having first and second outputs that transfer said address information stored therein, wherein (a) said first output transfers a first destination location to said register file, and (b) said second output transfers a second destination location to said register file;

a last-in, first-out (LIFO) backup queue that stores said second destination location and backup stores backup data corresponding to contents of said second destination location in the register file before that destination location is changed, said LIFO backup queue having a first and second input, wherein (i) said first input receives said second destination location from said second output of said FIFO result tag queue, and (ii) said second input receives said backup data from said register file; and first and second multiplexers that transfer said backup data from said LIFO backup queue back to said register file locations, according to said second destination location stored in said LIFO backup queue, after an instruction generates an exception.

17. The system according to claim 16, wherein said LIFO backup queue has a depth equal to the number of pipeline stages between a first cycle the register file is written and a second cycle that an exception is detected.

18. The computer system according to claim 16, wherein said FIFO result tag queue has a plurality of storage locations that store said address information corresponding to destination locations in said register file where instruction results are to be stored, said address information comprising a tag, which is part of the address of the destination location in the register file.

19. A register file backup system for use in computer system having a multi-stage pipeline that processes computer instructions, at least one of which generates a result, the computer system producing a result tag, corresponding to a destination address, for each result produced, the register file backup system comprising:

a result tag queue having a plurality of storage locations that store each result tag produced in computer program order;

a register file that stores each result produced in a location corresponding to said result tag of each result produced; and a backup queue that stores a portion of said result tag queue as a backup tag, and a portion of said register file as backup data.

20. The system according to claim 19, wherein said backup queue has a depth dependent on a number of pipeline stages (cycles) of the multi-stage pipeline between a cycle the register file is written and a cycle that an exception is detected.

21. The register file backup system according to claim 19, further comprising:

a first multiplexer that selects between said result data and unwrite data, wherein said unwrite data is backup data previously stored in said backup queue;

a second multiplexer that selects between a result tag and an unwrite tag, wherein said unwrite tag is a backup tag previously stored in said backup queue and corresponds to a location in said register file in which to place said unwrite data; and a controller that causes said first multiplexer to select said unwrite data and said second multiplexer to select said unwrite tag in order to restore a computer visual state of said computer system to a visual state prior to an exception or interrupt caused by a computer instruction that changes the state of said computer system.

22. The register file backup system according to claim 19, further comprising:

a first latch that temporarily stores said backup tag prior to being stored in said backup queue; and a second latch that temporarily stores said backup data prior to being stored in said backup queue, whereby said backup data and said backup tag can be input to said backup queue substantially simultaneously.

* * * * *